Aug. 30, 1955     W. M. SMITH ET AL     2,716,400
STANDBY HEATING SYSTEM FOR INTERNAL COMBUSTION ENGINES
Filed Nov. 6, 1952     2 Sheets-Sheet 1
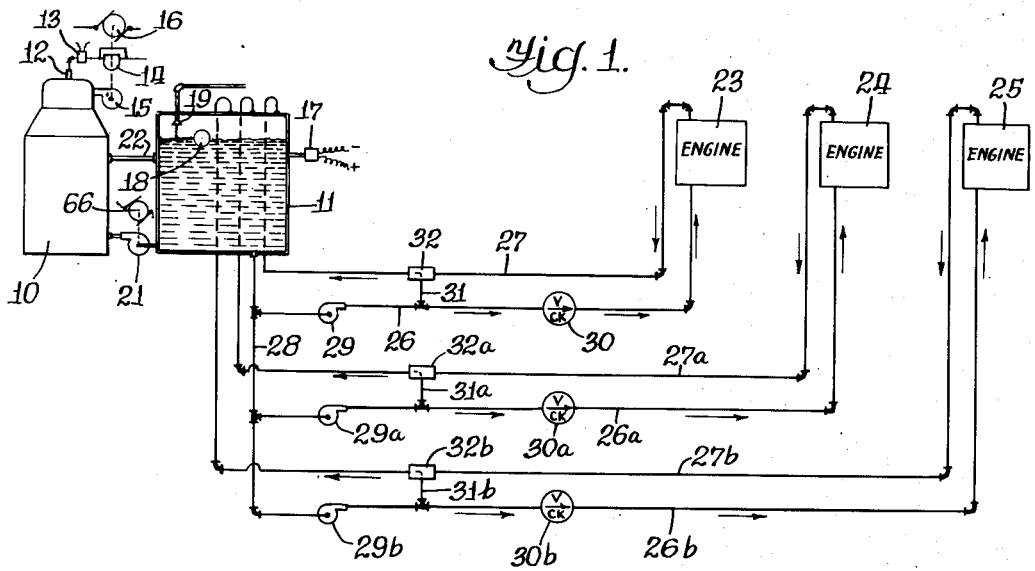
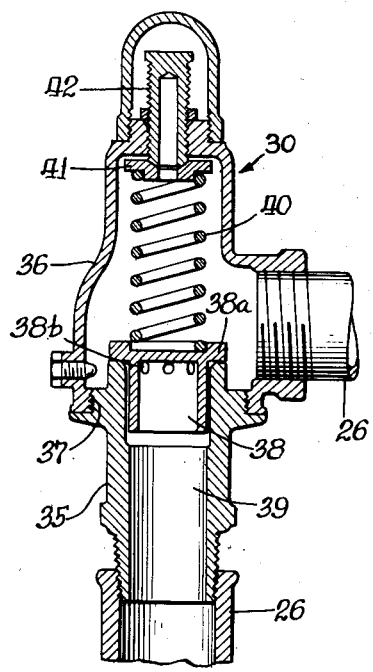
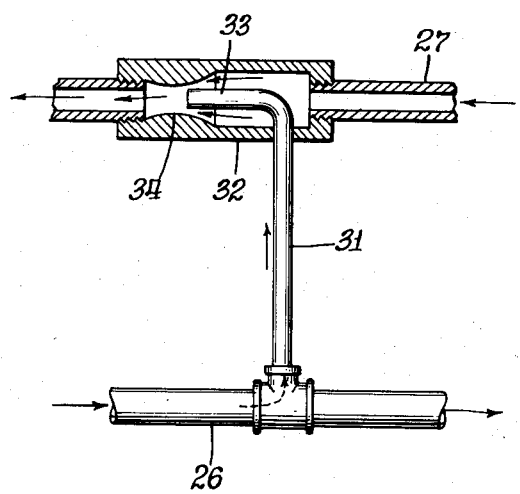
INVENTORS.
William M. Smith
Norman O. Kirby
By Harvey M. Gillespie
Atty.

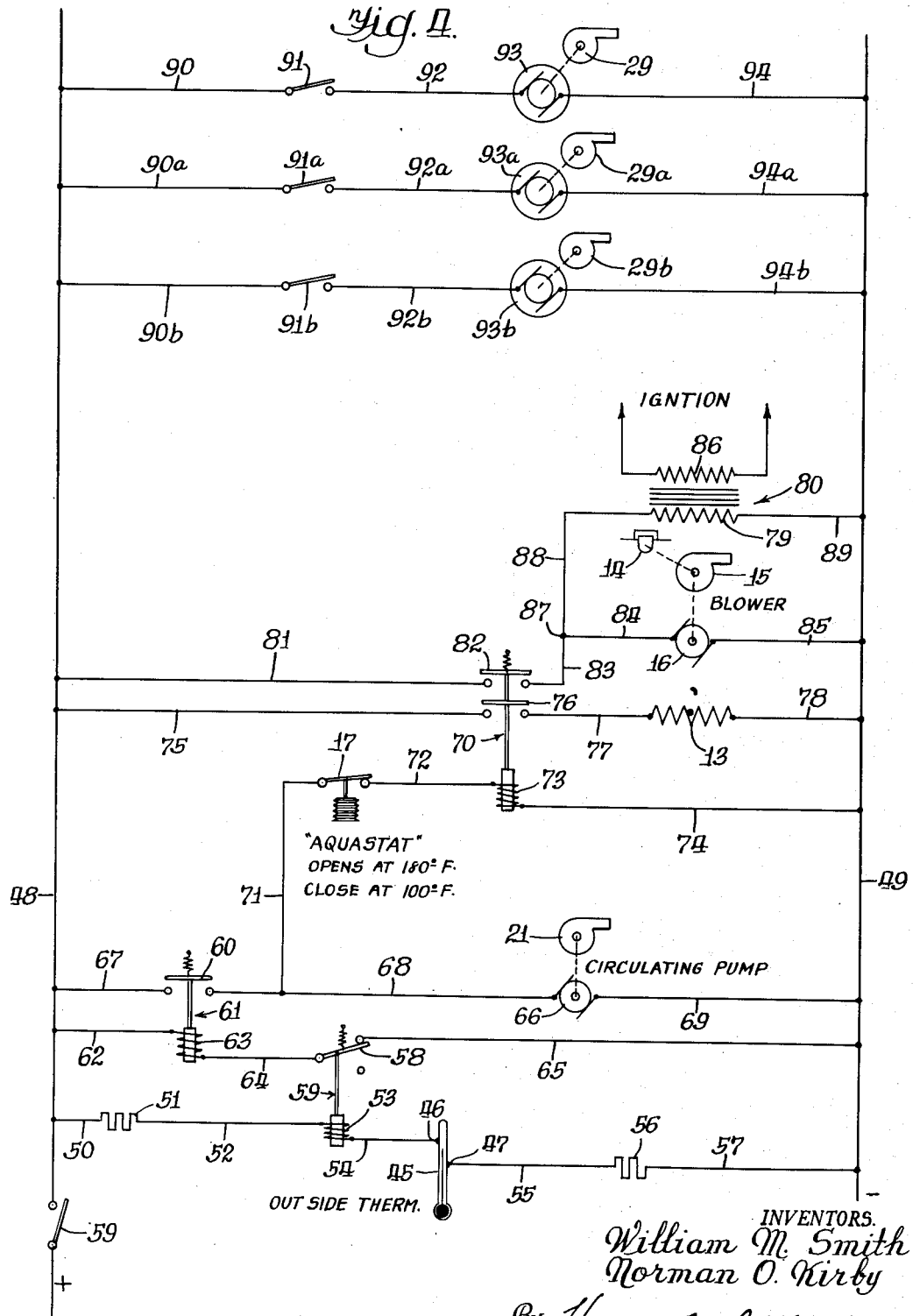

United States Patent Office

2,716,400
Patented Aug. 30, 1955

2,716,400

STANDBY HEATING SYSTEM FOR INTERNAL COMBUSTION ENGINES

William M. Smith, Lombard, and Norman O. Kirkby, Elmhurst, Ill., assignors to Vapor Heating Corporation, Chicago, Ill., a corporation of Delaware Application November 6, 1952, Serial No. 319,118

7 Claims. (Cl. 123—142.5)

This invention relates to an improved system for heating and circulating hot water through the engine cooling system of one or more of a group of internal combustion engines.

This invention is directed particularly to the provision of a hot water supply station for delivering hot water to the water cooling system of internal combustion engines employed as power units for Diesel locomotives; but the utility of the invention is not confined to this special use. It may be utilized in similar situations for supplying hot water to engine powered freight and passenger vehicles operating on railways and/or highways, while they are temporarily out of service, for example, during layovers between scheduled periods of operation.

The principal object of the invention is to provide a simplified structure of the above character which will operate automatically to keep in readiness a supply of water at a desired temperature to be delivered to the engines so as to maintain them at a desired temperature for operation and so as to replenish the supply of hot water in the engine cooling system.

Another and more specific object of the invention is to provide in a hot water supply station of the above character, supply and return lines in which a portion of the higher pressure water in the supply line is diverted into the return line so as to accelerate the return of water from an engine cooling system to the source of hot water supply.

A further object is to provide an automatically operated boiler for heating the supply of hot water and to provide control means responsive to the temperature of the hot water in a supply reservoir to control the operations of the boiler.

According to the invention an automatically controlled hot water heater is set into operation, when the outside temperature falls below a predetermined minimum, for example, 50° F., to heat a quantity of water contained in a storage reservoir to a predetermined maximum temperature. When the maximum temperature of the water is obtained the operation of the boiler is automatically interrupted and it remains dormant until the temperature of the water within the reservoir declines to a predetermined minimum. The heater is then set into operation again to raise the temperature of the water in said reservoir to the predetermined maximum. These recurrent heating and dormant periods of operation will continue as long as the outside temperature remains below the point selected for controlling the system, or until the operation of the system is manually deenergized.

The hot water from the storage reservoir is delivered into a supply manifold which is connected by separate supply lines to each of the engines and separate return lines extend from each of the engines being serviced to the hot water storage reservoir. An electrically operable pump is interposed in each of the supply lines so as to provide forced circulation of the water to and from the engine cooling system. In order to accelerate the flow of water through the return lines, a branch pipe leads from the pressure side of each supply line into an aspirator fitting interposed in the return line associated therewith, whereby a portion of the water under pressure from the supply line is introduced as a jet into the return line and thereby stimulates the flow of return water and provide the necessary force to elevate the return water into the storage reservoir.

The invention is illustrated in the accompanying drawing wherein:

Fig. 1 is a diagrammatic view illustrating a hot water heating and circulating system constructed according to the present invention to supply hot water to a plurality of engines;

Fig. 2 is an enlarged sectional view of an aspirator interposed in a return pipe of the system and provided with a connection leading from a supply pipe of the system, whereby a portion of the hot water under pressure in the supply pipe is directed into the return pipe to accelerate the return flow of water therein;

Fig. 3 is a sectional view of a check valve interposed in a supply line of the system; and Fig. 4 is a circuit diagram of the electrical circuits for controlling the water heating means and the water circulating pumps.

Referring to the drawing, 10 designates a water heater operable to heat a body of water contained in a supply reservoir 11. The water heater may be of any conventional type of boiler adapted to be fired with a fluid fuel so as to facilitate automatic operation. In the present embodiment, oil is introduced into the fire chamber of the boiler by means of a spray head 12, a solenoid valve 13 for controlling the delivery of fuel to the spray head and a fuel pump 14 for supplying the fuel oil under pressure. The fuel pump 14 and a blower 15 for supplying combustion air to the fire chamber are operated by the same motor 16. The energizing circuit for the motor 16, as will be more fully described in connection with the control circuits, is controlled by an "aquastat" 17 which is responsive to predetermined low and high temperature limits, respectively, of the water in the reservoir 11 to energize the motor 16 and fuel valve 13 so as to activate and deactivate the water heater 10.

The water is maintained in the reservoir 11 at a predetermined level by means of a float 18 and a valve 19 controlled thereby for controlling the admission of additional water into the reservoir 11. The heater 10 is supplied with water drawn from the reservoir 11 and forced into the inlet of the heater by means of an electrically operated pump 21. The heated water is discharged from the heater through an outlet pipe 22 into the upper portion of the reservoir 11.

Any suitable number of engines, commensurate with the capacity of the water heater 10 may be serviced with hot water. For the purpose of illustration, three engines 23, 24 and 25 are shown diagrammatically in Fig. 1. The upper portion of the said engines are herein shown slightly above the water level in the reservoir 11, but this specific arrangement is not important, since the return line connections are such as to prevent flow of water by gravity from the engine to the reservoir 11.

Referring first to the supply line 26 and the return line 27 for connecting the engine 23 to the hot water supply. The supply line 26 is connected into a supply manifold 28. The hot water is drawn from the manifold 28 by means of a circulation pump 29 and is forced through a pressure-opened valve 30 and thence into the engine block of the engine 23. The return pipe 27 leads from the upper portion of the engine block 23 and is connected into the upper portion of the hot water reservoir 11.

At a location intermediate the pump 29 and the pressure opened valve 30, a branch pipe 31 (shown best in Fig. 2) leads from the supply line 26 into an aspirator device 32. The said branch pipe 31 is provided with an end portion 33 which extends within the aspirator 32 in a direction lengthwise thereof and into a restricted or venturi throat portion 34. It will be seen, therefore, that hot water discharged under pressure from the end 33 of the branch 31 entrains a quantity of return water and therefore functions as an aspirator nozzle or injector to accelerate the flow of the return water and to provide the necessary force to elevate the return water to the upper portion of reservoir 11.

The pressure opened valve 30 comprises a casing composed of lower and upper elements 35, 36 screwed together at 37 and interposed in the delivery line 26. A valve element 38 is positioned in a through port 39. One end of a spring 40 seats against the valve. The other end of the spring is provided with a cap 41 which bears against the inner end of an adjusting screw 42, the latter of which is threaded through the end of section 36 of the casing. By appropriate turning of the adjusting screw, the compression of spring 40 may be varied so that the valve element 38 will open under any predetermined pressure. When the valve element 38 is closed, a flange 38$^a$ thereof bears against the valve seat. It is opened by the fluid pressure exerted against the valve in opposition to the compression of spring 40 so as to raise the flange 38$^a$ off the valve seat. In such case the hot water passes through the openings 38$^b$ of the valve element.

The feed and return lines for connecting the engines 24 and 25 are identical with the lines 26 and 27 and do not require specific description. These lines are also provided with pressure opened valves, branch pipes and aspirators. All of these corresponding elements associated with engine 24 are identified by the same reference numerals plus an exponent "$a$" and all of the said identical elements associated with engine 25 are identified with like numerals plus an exponent "$b$."

Referring now to the control circuits shown in Fig. 4: The control elements of the circuit are illustrated in the normal positions which they assume when the main switch is open and the temperature of the water in the storage reservoir is below 100° F. A thermostat 45, preferably of the mercury column type, is provided with spaced contacts 46, 47, which are connected across the positive and negative lines 48, 49. This circuit extends from the positive line 48 through lead 50, buffer resistor 51, lead 52, a relay solenoid 53, lead 54 to thermostat contact 46 and thence through the mercury column of thermostat to contact 47, lead 55, buffer resistor 56 and lead 57 to the negative line 49. The thermostat 45 controls the energization of solenoid 53 which, when energized opens a normally closed relay switch 58. It will be apparent, therefore, when a main switch 59 is closed and the temperature is below the temperature setting of thermostat 45, for example 50° F., the solenoid 53 is deenergized and thereby permits the contact 58 of relay 59 to assume its closed position. In such case an energizing circuit is established to close the relay contact 60 of a second relay 61. This circuit leads from positive line 48 through lead 62, solenoid 63 of relay 61, lead 64, contact 58 of relay 59, lead 65 to the negative line 49.

The energization of relay 61 closes a circuit for energizing an electric motor 66 for energizing the circulating pump 21 for withdrawing water from the supply reservoir 11 and forcing it into the water heater 10. This circuit extends from positive line 48 through lead 67, energized closed contact 60 of relay 61, lead 68, pump operating motor 66 and lead 69 to the negative line 49. It will be observed from the circuits thus far described, that the pump 21 will operate continuously to maintain the circulation of water through the heater 10 during the entire functioning of the system while the outside temperature remains below the temperature setting of said thermostat 45. The energization of the relay 61 also closes an energizing circuit through a relay 70 when the aquastat switch 17 is closed. The aquastat is a conventional type constructed to close the switch 17 when the temperature of the water within the reservoir 11 is at or below 100° F. and to open the switch 17 when the temperature of said water reaches 180° F. The circuit for energizing the relay 70 extends from the lead 68 through lead 71, closed aquastat switch 17, lead 72, solenoid 73 of relay 70 and lead 74 to the negative line 49. The energization of relay 70 closes a circuit to energize the solenoid of fuel valve 13 and thereby open the valve to permit fuel to pass to the spray head or nozzle 12. This circuit extends from positive line 48 through lead 75, energized closed contact 76 of relay 70, lead 77, solenoid of fuel valve 13 and lead 78 to the negative line 49. The energization of said relay 70 also closes a circuit for energizing the motor 16, which operates the blower 15 and the fuel pump 14 and also closes a circuit through the primary coil 79 of a transformer 80. The circuit through the motor 16 extends from positive line 48 through lead 81 energized closed contact 82 of relay 70, leads 83 and 84 through motor 16 and thence through lead 85 to the negative line 49. Simultaneously with the energization of the blower 15 and the fuel pump 14 the transformer 80 is energized by establishing a circuit through primary coil 79 and thereby energizes a secondary coil 86 so as to supply the desired current to the ignition system for igniting fuel delivered into the fire chamber of the boiler. The circuit through said primary coil of the transformer 80 extends from the junction 87 of leads 83—84 through lead 88, primary coil 79 and lead 89 to the negative line 49.

From the above description it will be apparent that during the operation of the water heating system herein shown, the water heater will be set into operation by the closing of the aquastat switch 17 to supply hot water to the reservoir 11 until the said water reaches a temperature of 180° F. At this temperature, the aquastat functions to open the energizing circuit of relay 70 and thereby permits its contacts 76 and 82 to move to their open positions so as to deenergize the heater 10. However, the circulation of water from the reservoir 11 through the heater 10 will be continued by virtue of the energization of motor 66 for actuating the circulating pump 21.

The forced circulation of hot water through the water jackets of the several engines being serviced is controlled by separate pumps 29, 29$^a$ and 29$^b$. The energization of pump 29 is established through a circuit extending from the negative line 48 through lead 90, manually closed switch 91 and lead 92 to a motor 93 for actuating a pump 29, thence through lead 94 to the negative line 49. The water will be supplied to the coolant system of the engine 23 as long as the switch 91 remains closed; the water being delivered into the coolant system to fill the system and maintain the engine in readiness for immediate service. The pumps 29$^a$ and 29$^b$ for maintaining circulation of hot water through the coolant system of engines 24 and 25 are operated by motors 93$^a$ and 93$^b$, respectively. The electrical circuits for energizing motors 93$^a$ and 93$^b$ are connected across the positive and negative lines 48 and 49 in the same manner as the circuit for energizing motor 93. Therefore these circuits and the manually operated switches associated therewith are identified by the same reference numerals with the addition of exponents "$a$" and "$b$," respectively.

While we have illustrated our invention in connection with certain specific constructions and arrangements, it will be understood that modifications of the constructions and arrangements may be made without departure from the spirit of our invention. It will be understood, therefore, that all such modifications coming within the scope of the appended claims are contemplated by the present invention.

We claim:

1. A standby water heating and circulating system for supplying hot water to the water jacket of an internal combustion engine when the latter is out of service comprising, in combination, a reservoir for containing a quantity of hot water, a water heater for heating the water in said reservoir, supply and return conduits connecting said reservoir with the water jacket of an internal combustion engine, a pump interposed in said supply conduit for forcibly withdrawing hot water from said reservoir and forcing it into said water jacket, a pressure opened valve interposed in said supply conduit at a location intermediate said pump and said water jacket, a by-pass conduit connected into said supply conduit intermediate said pump and said valve for by-passing a portion of said hot water from the supply conduit back to said reservoir; the said by-passed hot water being delivered under pressure into the return conduit and in a direction toward said reservoir, whereby to accelerate the flow of return water to the said reservoir.

2. A standby water heating and circulating system for supplying hot water to the water jacket of an internal combustion engine when the latter is out of service comprising, in combination, a reservoir for containing a quantity of hot water, a water heater for heating the water in said reservoir, a pump for maintaining continuous circulation of water from the reservoir through the water heater and back to the reservoir, automatic control means including a temperature responsive element for activating said water heater when the water in said reservoir reaches a predetermined minimum temperature and for deactivating the same when the temperature of the water reaches a predetermined maximum, supply and return conduits connecting said reservoir with the water jacket of an internal combustion engine, a pump interposed in said supply conduit for forcibly withdrawing hot water from said reservoir and forcing it into said water jacket, a pressure opened valve interposed in said supply conduit at a location intermediate said pump and said water jacket, a by-pass conduit connected into said supply conduit intermediate said pump and said valve for delivering under pressure a portion of said hot water from the supply conduit into the return conduit and in a direction toward said reservoir, whereby to by-pass a portion of the hot water back to the said reservoir and to accelerate the flow of return water to the said reservoir.

3. A standby water heating and circulating system for supplying hot water to the water jacket of an internal combustion engine when the latter is out of service comprising, in combination, a reservoir for containing a quantity of hot water, a water heater for heating the water in said reservoir, a pump for maintaining continuous circulation of water from the reservoir through the water heater and back to the reservoir, automatic control means including a temperature responsive element for activating said water heater when the water in said reservoir reaches a predetermined minimum temperature and for deactivating the same when the temperature of the water reaches a predetermined maximum, and a thermostat responsive to the outside ambient for controlling the effectiveness of said temperature responsive element, supply and return conduits connecting said reservoir with the water jacket of an internal combustion engine, a pump interposed in said supply conduit for forcibly withdrawing hot water from said reservoir and forcing it into said water jacket, a pressure opened valve interposed in said supply conduit at a location intermediate said pump and said water jacket, a by-pass conduit connected into said supply conduit intermediate said pump and said valve and leading into said return conduit for delivering under pressure a portion of said hot water from the supply conduit into the return conduit and in a direction toward said reservoir, whereby to accelerate the flow of return water to the said reservoir.

4. A standby water heating and circulating system as defined in claim 1, characterized in that the return conduit extends to a selected height above the top portions of both the reservoir and the engine jacket to prevent flow of the water by gravity from the engine jacket into the reservoir and vice versa.

5. A standby water heating and circulating system as defined in claim 4 characterized in that a plurality of supply and return conduits are provided, whereby a plurality of internal combustion motors may be serviced simultaneously.

6. A standby water heating and circulating system for a plurality of internal combustion engines as defined in claim 5 characterized in that said plurality of supply conduits lead from a common manifold communicating with the lower portion of said reservoir and in that the pressure opened valves interposed in the supply conduits are adjustable, whereby to distribute the water uniformly through the several supply conduits.

7. A standby water heating and circulating system as defined in claim 6 characterized in that the branch conduit for by-passing a portion of the hot water from the supply conduits to the return conduits cooperates with an element having a venturi throat and functioning as an aspirator to entrain the return water and elevate it into said reservoir.

References Cited in the file of this patent

UNITED STATES PATENTS

| 1,234,049 | Lovell | July 17, 1917 |
| 2,180,663 | Bergeron et al. | Nov. 21, 1939 |
| 2,367,197 | Caldwell | Jan. 16, 1945 |
| 2,646,028 | Russell et al. | July 21, 1953 |

FOREIGN PATENTS

| 461,586 | Germany | June 23, 1928 |
| 60,135 | Netherlands | Oct. 15, 1947 |